United States Patent [19]

Meyers

[11] Patent Number: 5,409,715
[45] Date of Patent: Apr. 25, 1995

[54] USE OF EDIBLE FILM TO PROLONG CHEWING GUM SHELF LIFE

[75] Inventor: Marc Meyers, Naperville, Ill.

[73] Assignee: Wm. Wrigley Jr. Company, Chicago, Ill.

[21] Appl. No.: 49,813

[22] Filed: Apr. 20, 1993

Related U.S. Application Data

[63] Continuation-in-part of Ser. No. 871,962, Apr. 21, 1992, Pat. No. 5,286,502.

[51] Int. Cl.⁶ ............................................. A23G 3/30
[52] U.S. Cl. ................................. 426/5; 426/138; 426/302
[58] Field of Search ........................... 426/3–6, 426/89, 99, 96, 302, 138

[56] References Cited

U.S. PATENT DOCUMENTS

| | | | |
|---|---|---|---|
| 4,105,801 | 8/1978 | Dogliotti | 426/99 |
| 4,117,173 | 9/1978 | Schiweck et al. | 426/548 |
| 4,127,677 | 11/1978 | Fronczkowski et al. | 426/5 |
| 4,146,653 | 3/1979 | Mader et al. | 427/3 |
| 4,224,219 | 9/1980 | Van Blanton et al. | 260/112 G |
| 4,317,838 | 3/1982 | Cherukuri et al. | 426/5 |
| 4,323,588 | 4/1982 | Vink et al. | 426/564 |
| 4,359,531 | 11/1982 | Bucke et al. | 426/658 |
| 4,423,086 | 12/1983 | Devos et al. | 426/3 |
| 4,567,053 | 1/1986 | Lindley | 426/538 |
| 4,568,560 | 2/1986 | Schobel | 426/5 |
| 4,587,119 | 5/1986 | Bucke et al. | 426/658 |
| 4,661,359 | 4/1987 | Seaborne et al. | 426/89 |
| 4,681,766 | 6/1987 | Huzinec et al. | 426/5 |
| 4,693,974 | 9/1987 | Schwengers et al. | 426/658 |
| 4,777,046 | 10/1988 | Iwakura et al. | 424/435 |
| 4,786,511 | 11/1988 | Huzinec et al. | 426/5 |
| 4,792,453 | 12/1988 | Reed et al. | 426/5 |
| 4,802,924 | 2/1989 | Woznicki et al. | 426/3 |
| 4,810,534 | 3/1989 | Seaborne et al. | 426/89 |
| 4,822,622 | 4/1989 | Dokuzovic et al. | 426/5 |
| 4,824,680 | 4/1989 | Bernatz et al. | 426/3 |
| 4,828,845 | 5/1989 | Zamudio-Tena et al. | 426/5 |
| 4,915,971 | 4/1990 | Fennema et al. | 426/578 |
| 4,931,294 | 6/1990 | Yatka et al. | 426/3 |
| 4,961,935 | 10/1990 | Cherukuri et al. | 426/3 |
| 4,976,972 | 12/1990 | Patel et al. | 426/3 |
| 5,048,260 | 9/1991 | Raymond et al. | 53/370.8 |
| 5,089,307 | 2/1992 | Ninomiya et al. | 426/138 |
| 5,130,150 | 7/1992 | Averbach | 426/99 |
| 5,130,151 | 7/1992 | Averbach | 426/99 |

FOREIGN PATENT DOCUMENTS

| | | |
|---|---|---|
| 0273000 | 6/1988 | European Pat. Off. |
| 0298768 | 1/1989 | European Pat. Off. |
| 0328849 | 8/1989 | European Pat. Off. |
| WO86/00501 | 1/1986 | WIPO |
| WO87/003453 | 1/1987 | WIPO |
| WO87/07902 | 12/1987 | WIPO |
| WO89/03170 | 4/1989 | WIPO |
| WO90/06061 | 6/1990 | WIPO |
| WO90/07864 | 7/1990 | WIPO |
| WO90/13994 | 11/1990 | WIPO |
| WO91/03147 | 3/1991 | WIPO |

OTHER PUBLICATIONS

Brochure: "Palatinit Infopac", Sussungsmittel GmbH (1984).

*Primary Examiner*—Jeanette Hunter
*Attorney, Agent, or Firm*—Hill, Steadman & Simpson

[57] ABSTRACT

An improved chewing gum composition and methods for making same. Chewing gums are created having improved shelf life. To this end, the chewing gum is coated with an edible material that provides barrier properties, and specifically a moisture barrier. The coating can comprise: a multilayer coating of two or more materials (e.g., a layer of an edible film forming agent and a layer of wax); a single layer of material (e.g., a layer of only edible film forming agent); or an emulsion of two or more materials. A variety of different coatings are possible pursuant to the present invention.

27 Claims, 11 Drawing Sheets

13.3% E5 HPMC SOLN.

— CONTROL  ✳— 0.50 MIL
◇— 0.90 MIL  △— 1.50 MIL (COATING THICKNESS IN MILS PER EACH SIDE OF THE STICK)

ACCEL. AGED 58% RH / 85 F

VARIOUS COATINGS

— CNTRL 1    + CNTRL 2
—✕— 1.1 VIC/1.1 HPMC-UNPD   —◇— 1.1 VIC/0.9 HPMC PRP (COATING THICKNESS IN MILS PER EACH SIDE OF THE STICK)

ACCEL. AGED 58% RH /85F

CNTRL1=PRODUCTION
CNTRL2=ROLLING COMP'D. REMOVED

USE OF EDIBLE FILM TO PROLONG CHEWING GUM SHELF LIFE

This is a continuation-in-part of U.S. patent application Ser. No. 07/871,962, filed on Apr. 21, 1992, now U.S. Pat. No. 5,286,502.

BACKGROUND OF THE INVENTION

The present invention relates generally to chewing gum and methods of manufacturing same.

During storage, chewing gum has a tendency to lose or gain moisture from the surrounding atmosphere depending on the surrounding temperature, relative humidity, and packaging, and also depending on the shape and formulation of the chewing gum. Sugar-containing chewing gums, for instance, typically contain corn syrup and a small amount of humectant such as aqueous sorbitol or glycerin. Such sugar-containing chewing gums have a tendency to dry out and become brittle when stored under relatively dry conditions of 50% relative humidity and lower. The tendency of sugar gums to dry out and become brittle is particularly apparent at higher ambient temperatures.

Sugarless chewing gums are typically designed to contain lower amounts of moisture than sugar-containing gums. In sugarless gums which are sweetened with aspartame or other moisture-susceptible artificial sweeteners, it is important to maintain a low moisture content in order to prevent loss of sweetness and flavor qualities. However, due to their low initial moisture content and high level of hygroscopic ingredients, these sugarless gums tend to gain moisture above 40% relative humidity, causing wetness of the chewing gum and degradation of the aspartame or other moisture-susceptible ingredients.

Various technologies have been developed for the purpose of protecting chewing gum from moisture loss, moisture gain and other adverse changes which result from storage. For example, packaging techniques have been developed which provide sealed, high quality protective packaging for individual chewing gum sticks. One such technique is disclosed in U.S. Pat. No. 5,048,260 to Raymond et al.

Other techniques of protecting chewing gum from adverse environmental conditions have involved modifying the chewing gum formulae so as to encapsulate or otherwise protect the individual chewing gum ingredients which are environmentally susceptible. U.S. Pat. No. 4,822,622 to Dokuzovic et al. discloses the use of a protective barrier film through the center of a chewing gum to separate a flavor-containing chewing gum layer from an aspartame-containing chewing gum layer. The barrier film components which are disclosed include gelatin, acacia gum, agar, algin and derivatives, carrageenan and salts thereof, arabinogalactan, baker yeast, glycan, carboxymethylcellulose, carob bean gum, cellulose gum, furcellaran and salts thereof, guar gum, gum arabic, hydroxypropyl cellulose, hydroxypropyl methyl cellulose, Irish moss gelose, karaya gum, locust bean gum, methylcellulose, methylethyl cellulose, pectin, propylene glycol alginate, propylene glycol ether of methylcellulose, sodium carboxy methylcellulose, tragacanth gum, xanthan gum, shellac, and mixtures thereof.

U.S. Pat. No. 4,568,560 discloses a method for encapsulating active ingredients in a coating composition comprising a water soluble film forming composition, an enteric compound and a plasticizer for the film forming composition. U.S. Pat. No. 4,824,680 to Bernatz et al. discloses a method for producing a sugar-based chewing gum having improved wrapability.

Still other techniques of protecting chewing gum from adverse environmental conditions have involved coating the chewing gum with an edible film. Most of these techniques have focussed on the film coating of chewing gum tablets and other confectionery tablets, as opposed to chewing gum sticks. U.S. Pat. No. 4,802,924 and PCT Publication WO 87/07902 disclose the coating of pharmaceutical tablets, foods, confectionery forms and the like with polydextrose, or a combination of polydextrose and cellulosic polymer, or a layer of polydextrose overcoated by a layer of cellulosic polymer. German Patent No. DE 3,043,914 discloses the coating of pharmaceuticals, confectionery products and foods, with an edible film containing methyl cellulose, hydroxypropyl methyl cellulose, hydroxypropyl cellulose, cellulose acetate phthalate, ethyl cellulose, polyvinyl pyrrolidone, sodium ethyl cellulose sulfate, corn protein (zein), and/or poly (vinyl acetate phthalate).

U.S. Pat. No. 4,810,534 to Seaborne et al. discloses a method for preparing a low water permeable, edible film containing cross-linked shellac and one or more edible sources of polyphenolics, benzaldehyde and derivatives, acetylated monoglycerides, polyglycerol esters, straight chain monocarboxylic acid and dicarboxylic acids. U.S. Pat. No. 4,777,046 to Iwakura et al. discloses a sheet-like preparation comprising a drug, a gelatin or agar, gluten, a carboxyvinyl polymer, a polyhydric alcohol, a gum, a wax and a sheet-like support. PCT Publications WO 87/03453 and WO 86/00501 both disclose methods of preparing preformed edible films which include a layer of a hydrophilic polymer selected from the group consisting of edible, film-forming carbohydrates and proteins, and a lipid layer adhered to the hydrophilic layer.

There is a need or desire in the chewing gum industry for a coating and coating method which is uniquely suited to the prevention of moisture absorption and moisture loss from stick chewing gum. Chewing gum sticks, due to their high ratios of surface area to volume, are susceptible to rapid changes in their moisture content when exposed to adverse environmental conditions. Also, stick gums are more difficult to uniformly coat then pellet gums due to their large surface areas.

SUMMARY OF THE INVENTION

The present invention relates to improved chewing gum compositions and methods for making same. Pursuant to the present invention, chewing gums are created having improved shelf life. To this end, the chewing gum is coated with an edible material that provides barrier properties, and specifically a moisture barrier.

The coating can comprise: a multilayer coating of two or more materials (e.g., a layer of edible film and a layer of wax); a single layer of material (e.g., a layer of only edible film); or an emulsion of two or more materials. A variety of different coatings are possible pursuant to the present invention.

In an embodiment, a method of preparing coated chewing gum sticks having an improved shelf life is provided. The method includes preparing a chewing gum composition including a water soluble bulk portion, a water insoluble chewing gum base portion, and one or more flavoring agents. The chewing gum composition is formed into a sheet having first and second sides. A coating of edible film forming agent is applied to the first and second sides of the sheet. Then, a coating of a second material chosen from the group consisting of wax, fatty acids, fats, oils, and other lipid derivatives is applied over the edible film forming agent. The chewing gum sheet is then cut into chewing gum sticks.

A variety of methods can be used for applying the edible film including spraying, rolling, and coextruding the edible film.

In an embodiment, a method for preparing coated chewing gum sticks having improved shelf life is provided. The method includes the step of preparing a stick of chewing gum that includes a coating of an edible material that provides sufficient vapor barrier properties to provide the stick of chewing gum with a more stable moisture content under ambient conditions than a stick of chewing gum that does not include the coating.

In an embodiment, the coating of edible material includes an edible film chosen from the group consisting of: cellulose derivatives; modified starch; dextrin; gelatin; zein; vegetable gums; proteins; edible polymers; edible plastic film; maltodextrins; polyols; low calorie carbohydrate bulking agents; shellac; and combinations thereof.

In an embodiment, the coating of edible material includes a component chosen from the group consisting of: wax, lipids, fatty acids, fats, and oils. The wax can be selected from the group consisting of: beeswax; carnauba wax; candelilla wax; microcrystalline wax; paraffin wax; synthetic hydrocarbon polymer type waxes; and combinations thereof.

In an embodiment, the coating of edible material comprises: a first layer of an edible film; and a second layer of a material chosen from the group consisting of: wax, lipids, fatty acids, fats, and oils.

In en embodiment, the coating of edible material is an emulsion including at least two materials chosen from the group consisting of: carbohydrates; modified carbohydrates; carbohydrate derivatives including celluloses, gums, and gum derivatives; proteins; and lipids.

In an embodiment, the coating of edible material includes an emulsion chosen from the group consisting of pseudolatexes and colloidal dispersions; ethylcellulose emulsions; and wax emulsions.

The present invention also provides improved chewing gum compositions. To this end, in an embodiment, a chewing gum stick is provided comprising: a chewing gum composition including a water soluble bulk portion, a water insoluble chewing gum base portion, and one or more flavoring agents formed into a chewing gum stick. The chewing gum stick includes a coating including an edible material and a material chosen from the group consisting of wax, fatty acids, fats, oils, and lipid derivatives.

An advantage of the present invention is that it provides improved methods for manufacturing chewing gum.

Furthermore, an advantage of the present invention is that it provides an improved chewing gum composition.

Moreover, an advantage of the present invention is that it provides a chewing gum composition having improved shelf life as compared to typical chewing gum compositions.

Still further, an advantage of the present invention is to provide compositions that can be used to coat chewing gum to provide improved shelf life therefor.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
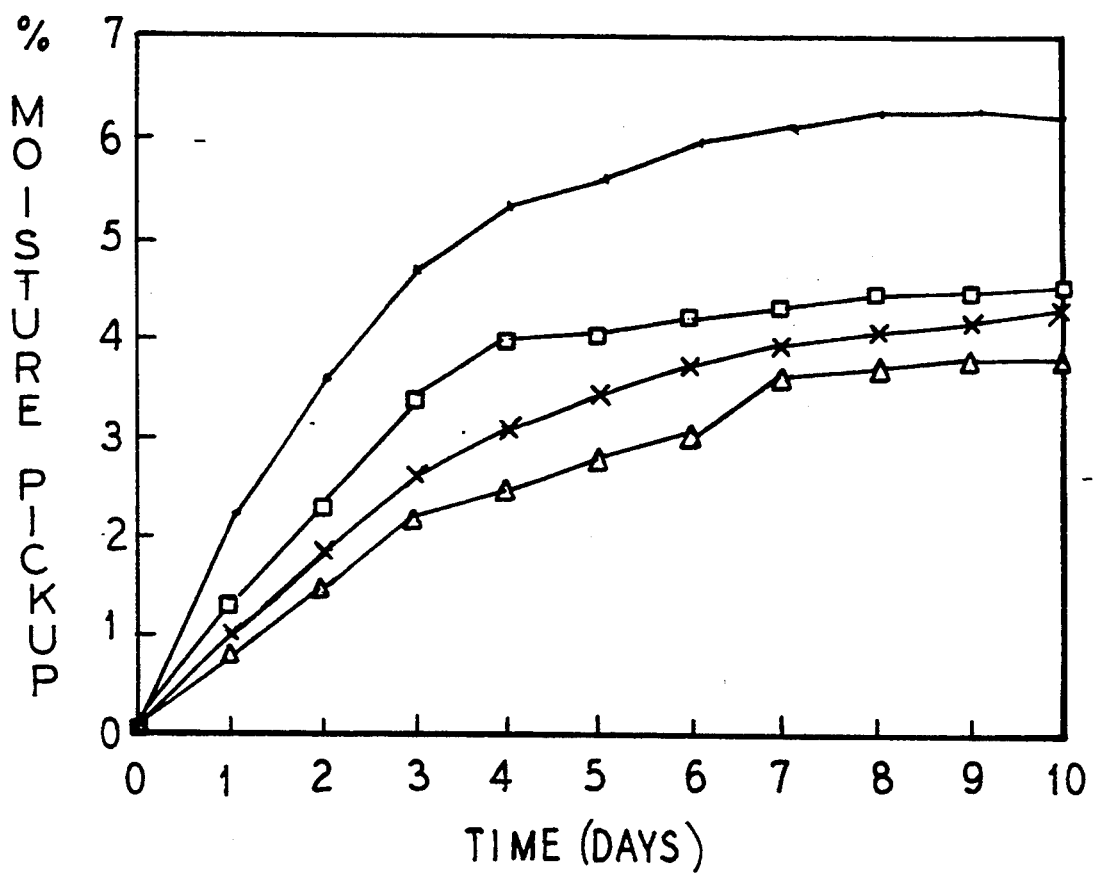
FIG. 1 illustrates the weight gain as a function of time for chewing gum sticks coated on both sides with 0.9 mils (wet) of aqueous hydroxypropyl methylcellulose (HPMC) and beeswax, for different thicknesses of wax coating, at 58% relative humidity and 85° F.

Pursuant to the present invention, improved chewing gum compositions are provided. To this end, the chewing gum is coated with an edible material that provides barrier properties. The chewing gum piece is coated with an edible material that provides moisture barrier properties. This coating may comprise: a multilayer coating of two or more materials (e.g., a layer of edible film and a layer of wax); a single layer of material (e.g., a layer of only edible film); or an emulsion of two or more materials. A variety of different coatings are possible pursuant to the present invention.

What is important is that the chewing gum with the coating of edible material is more moisture stable at ambient conditions than it would be without the coating. As used herein, "edible material" includes any material that does not have to be removed from the chewing gum before it is chewed, i.e., a material that can be chewed and ingested by the consumer.

In accordance with the invention, in an embodiment, a chewing gum composition is provided which has been manufactured, rolled using a dusting or rolling compound, and sheeted according to procedures well known in the art. The chewing gum sheet is coated on one surface using an aqueous solution of an edible, water soluble film forming agent. The edible, water soluble film forming agents which are presently contemplated for use with the invention include cellulose derivatives, modified starch, maltodextrin, polyols, low calorie carbohydrate bulking agents, including indigestible dextrin, oligofructose, and polydextrose, dextrin, gelatin, zein, zein protein, whey and soy protein and gluten, edible polymer film, edible plastic film, and vegetable gums including guar gum, locust bean gum, carrageenan gum, acacia, karaya, ghatti, tragacanth, tamarind gum, agar, alginates, pectin, xanthan gum; and combinations of same. However, it is expected that any edible film forming agent which exhibits the necessary characteristics can be used.

In an embodiment, the preferred water soluble film forming agents are cellulose derivatives. These include ethyl cellulose, hydroxypropyl methyl cellulose, methyl cellulose and sodium hydroxymethyl cellulose. Of these, the most preferred water soluble film forming agent is hydroxypropyl methyl cellulose (HPMC).

The water soluble film forming agent is used in an aqueous solution which includes about 5 to about 25 weight percent water soluble film forming agent. In an embodiment, preferably, the aqueous solution includes about 10 to about 20 weight percent water soluble film forming agent, most preferably about 13 weight percent. A commercially available food grade HPMC which is particularly suitable for use in the invention is Methocel E5 available from the Dow Chemical Co., Midland, Mich. A plasticizer may be mixed with the HPMC in order to improve flexibility of the film.

The solution of film forming agent can be applied using a variety of techniques including: co-extrusion; off-set printing—direct roller contact; electrostatic spraying; high-pressure air spraying; pressurized porous rollers; vibratory feeder (powder); non-contact off-set printing—using a doctor blade to remove film from the roller; wick (pressure fed brush); auger (powder); enrober equipment; and extruding the film and laminate onto the chewing gum.

By way of general description, briefly the processes are as follows.

In coextrusion, a method is provided for extruding two (2) materials simultaneously. Commercial extruders are available which extrude one material, such as a chewing gum, in the center, with a second material being extruded around it. Many bakery and confectionery products are manufactured using this process. Coextrusion will allow the coating of the present invention to be applied to the chewing gum.

Through off-set printing, a roller is used which rotates through a reservoir containing the media to be applied, typically ink or an adhesive. The media is picked up by the roller which then rotates and contacts the surface of the material that the media is being applied to. A "doctor blade" can be used to control the thickness of the media on the roller which along with a pressure roller controls the amount of media applied to the material. Instead of ink, the coating compositions of the present invention can be used and are coated onto the chewing gum.

By using non-contact off-set printing, a similar concept to that of off-set printing is used except that the roller carrying the media would not come into contact with the material that the media is being applied to. In this case a second "doctor blade" would be used to remove or scrape the media off of the roller and deposit it on the material. Again, the media would comprise the coating compositions and the material the chewing gum.

Electrostatic spraying provides a process that is typically used in painting or ink jet printing. Micron size particles are electrically charged and forced through a spray nozzle. The particles then are attached to the material to be coated. In the present invention, these particles would be the compositions of the present invention and the material the chewing gum.

Through the use of a porous roller process, a hollow roller made from a porous material is provided. The media (coating composition of the present invention) is fed into the center of the roller under pressure. The roller is then placed in contact with the material (chewing gum sheet) that the media being applied to. The amount of the media to be applied is controlled by the amount of pressure and speed of the roller.

By way of example, and not limitation, a detailed example of a coating technique will now be given. The film forming agent can be applied, for example, by using spraying equipment which is capable of spraying a fine mist of the solution. An example of suitable spraying equipment is the Nordson Model 64B airless sprayer, available from Nordson Corp., Amherst, Ohio. If a spraying technique is used, during spraying, the spraying nozzle should be about 10 inches or slightly less above the chewing gum surface. In an embodiment, a sufficient amount of the aqueous solution should be applied to give a wet coating thickness of about 0.25 to about 1.5 mils, preferably about 0.7 to about 1.2 mils, most preferably about 1.0 mils.

Assuming a rolling or dusting compound is used, in some instances, it may be desirable to remove any rolling or dusting compound present on the surface of the chewing gum sheet, before applying the aqueous solution of edible film forming agent. Removal of the dusting compound is not always necessary or beneficial, but may be necessary in instances where the edible film forming agent is applied as a relatively thin coating, or is otherwise easy to crack during or after drying. Removal of much of the dusting compound can be accomplished by applying a dry cloth to the surface of the chewing gum sheet, followed by a damp cloth. During production, the rolling compound may alternatively be removed using a brush, vacuum, or other suitable technique.

In an embodiment, after the aqueous solution of edible film has been applied, the solution is allowed to dry partially or until the coating becomes tacky and can no longer flow. The coating should not be so dry that its adhesive properties are lost, or so wet that its adhesive properties are not apparent. The drying is preferably accomplished over a short period of time of about 30 seconds to about two minutes, depending on the wet thickness of the coating. If desired, the drying can be aided by the use of a forced air blower, using air that is heated to a temperature of no greater than about 120° F.

Depending on the barrier properties of the edible film forming agent, it may be desirable to coat the edible film with another material. To this end, in an embodiment, after the aqueous solution of edible film forming agent has been partially dried to a paste or glue, a layer of wax or other composition can be applied over the edible film forming agent. The types of waxes which are suitable for use with the invention include: natural waxes such as beeswax, candelilla, and carnauba wax; microcrystalline waxes such as Victory wax, Besquare wax and Star wax; and paraffin waxes. Of these, the preferred wax is beeswax. However, it is envisioned that other components having wax-like properties can be used such as lipids including fatty acids, fats, and oils.

Likewise, as previously stated, if desired, the wax, lipid, fat, or oil derivatives, depending on manufacturing issues and barrier properties, may be used alone as the edible material without the edible film material discussed above.

In a similar vein, an emulsion of ingredients can be used and coated on the gum. For example, pseudolatexes and colloidal dispersions, ethylcellulose emulsions, and wax emulsions can be used. In an embodiment of the method, the coating of edible material is an emulsion including at least two materials chosen from the group consisting of: carbohydrates; modified carbohydrates; carbohydrate derivatives, including celluloses, gums, and gum derivatives; proteins; and lipids including waxes, oils, fats, and lipid fatty acid derivatives.

Indeed, a great number of ingredients are envisioned for use as the edible film. These include, without limitation; latex-type emulsions, ethylcellulose emulsions; polyvinyl acetate; sorbitan esters; polyoxyethylene sorbitan esters; glycol polyethylene wax esters/polyethylene glycol esters; ethoxylated esters; glycerol esters/-polyglycerol esters; bacterial cellulose fiber; microparticulated cellulose; cellulose derivatives; sodium alginate, propylene glycol alginate, etc. for gelling with calcium chloride salt; zein solutions; alcoholic shellac; pullulan cellulosic pre-casted films with plasticizers; cellulosics films with alcohol and stearic acid, beeswax, refined paraffin wax, hydrogenated palm oil, PEG (polyethylene glycol), lauric acid, palmitic acid, arachidic acid, oleic/linoleic, linolenic acids, eladic acid, carnauba wax, candelilla wax, rice bran wax, and microcrystalline wax; protein films based on gluten, gliadin glutenin or zein; chitosan/chitin; lecithin; ionization of lipid droplets to attach to gum surface; cocoa butter, chocolate; silicon oxides (syloid) $SiO_2$ or $CaSiO_3$; $MgSiO_3$; high amylose starch; sugarcane wax; cocoa wax; montan wax; flax and cotton seed wax; vegetable wax/vegetable oil suspension, including coconut oil, palm kernel oil, soybean oil, corn oil, sesame oil, safflower oil, cottonseed oil, and a combination of above products; calcium carbonate; calcium sulfate; mineral oil; oxidized polyethylene; medium chain triglycerides; zein/alcohol solution; sugar esters; extruded cellulosics with PEG; purified shellac with citric acid; performed films of celluloses pullulan, etc.; other protein film formers; acetylated monoglycerides; triacetin, tristearin; magnesium stearate; palm oil, palm kernel oil, transhardened veg. oil, cocoa butter, fractionated veg. oil, hydrog. palm kernel stearine.

If wax is used, the wax is preferably applied in the molten state in order to facilitate uniformity of application and adhesion, but can alternatively be applied as a powder and pressed and optionally heated to melt the wax An example of equipment which is suitable for applying the wax is the Nordson Model 2302 hot melt wax spray applicator, equipped with an H20T spray gum with a cross-cut nozzle, available from the Nordson Corp., Amherst, Ohio.

If a spraying process is used, during spraying, the spraying nozzle should be about one inch above the chewing gum surface, in order to ensure that the wax remains molten until after contacting the previously applied coating of edible film forming agent. In an embodiment, a sufficient amount of the wax should be applied to give a wax coating thickness of about 0.5 to about 3.0 mils, preferably about 0.7 to about 2.0 mils, most preferably, about 1.0 mil. The thickness of the wax coating does not change significantly as the wax hardens to a solid.

In an embodiment, after the wax has hardened, then the entire coating process is repeated on the opposite surface of the chewing gum sheet. Alternatively, both sides of the gum can be coated simultaneously. After both sides of the chewing gum sheet have been coated, the chewing gum can be scored, cut into sticks and wrapped. In an alternative embodiment, the chewing gum can be scored and cut into sticks before one or both surfaces have been coated.

A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition, more typically 10– 50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further, parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1–11 (GENERAL PROCEDURE)

The following chewing gum formulation was prepared for use in a variety of trials described hereinafter in the Examples:

| Component | Weight Percent |
|---|---|
| Gum Base | 24.4 |
| Sorbitol | 48.75 |
| Coevaporated blend of 67.5% Lycasin hydrogenated starch hydrolysate solids, 25% glycerin and 7.5% water | 9.1 |
| Mannitol | 8.0 |
| Glycerin | 7.7 |
| Peppermint Flavor | 1.6 |
| Encapsulated Aspartame | 0.2 |
| Brown Color Dispersion | 0.05 |
| 10% Salt Solution | 0.05 |
| Lecithin | 0.15 |
| TOTAL | 100.00 |

For purposes of the following Examples, the chewing gum was rolled using a mannitol rolling compound, sheeted, scored and cut into sticks. Then, the chewing gum sticks were coated according to the following general procedure. For some of the samples used in the following Examples, one or more steps of the procedure were omitted, as will become hereinafter apparent.

Procedure a. Remove the rolling compound from the chewing gum sticks by wiping with a dry cloth, followed by a damp cloth. Allow the chewing gum sticks to dry.

b. Flush a Nordson hot melt wax spray applicator for 10–15 minutes using the appropriate wax.

c. Apply a coating of Methocel E5 solution (13.3% HPMC in water) to one surface of the chewing gum stick, using a Nordson airless solution sprayer. Using an air dryer with low heat (about 120° F.), dry the aqueous HPMC coating partially until it becomes tacky, and will not flow. Drying time should generally be no longer than about 30 seconds to about two minutes.

d. Apply a coating of wax over the partially dried coating of Methocel E5. Allow the wax to harden.

e. Repeat steps "a" through "d" for the opposite surface of the chewing gum sticks.

After the chewing gum sticks were coated on both sides, the coated samples (unwrapped) were stored under controlled conditions of 58% relative humidity and 85° F., for several days. The samples were weighed periodically in order to calculate the percent weight change due to moisture pickup. The results were plotted in FIGS. 1–11. In order to facilitate a clear understanding of these graphs, the comparisons made in each of the Figures are discussed individually in the following Examples 1–11.

EXAMPLE 1

Referring to FIG. 1, chewing gum sticks were coated on both sides with a 0.9 mil coating of 13.3% Methocel E5 solution (measured before any drying occurred) and with various thicknesses of beeswax. The sample designated as "control" consisted of sticks of the chewing gum without any coating of HPMC or wax, which were "unprepared" (i.e., without the rolling compound removed). The remaining samples were "prepared" (i.e., the rolling compound was removed), were coated with aqueous HPMC, and were coated with 0.9, 1.65 and 3.0 mils of beeswax, respectively.

FIG. 1 indicates that the "control" chewing gum sample picked up more than six weight percent additional moisture from the surrounding atmosphere, over the 10-day storage period. The remaining samples, which exemplified a preferred embodiment of the invention (a preferred edible film forming agent and a preferred wax) showed at least a 30% reduction in moisture pickup, for the 10 days. The reduction in moisture pickup improved somewhat as the thickness of the beeswax increased.

EXAMPLE 2

Figure 2:
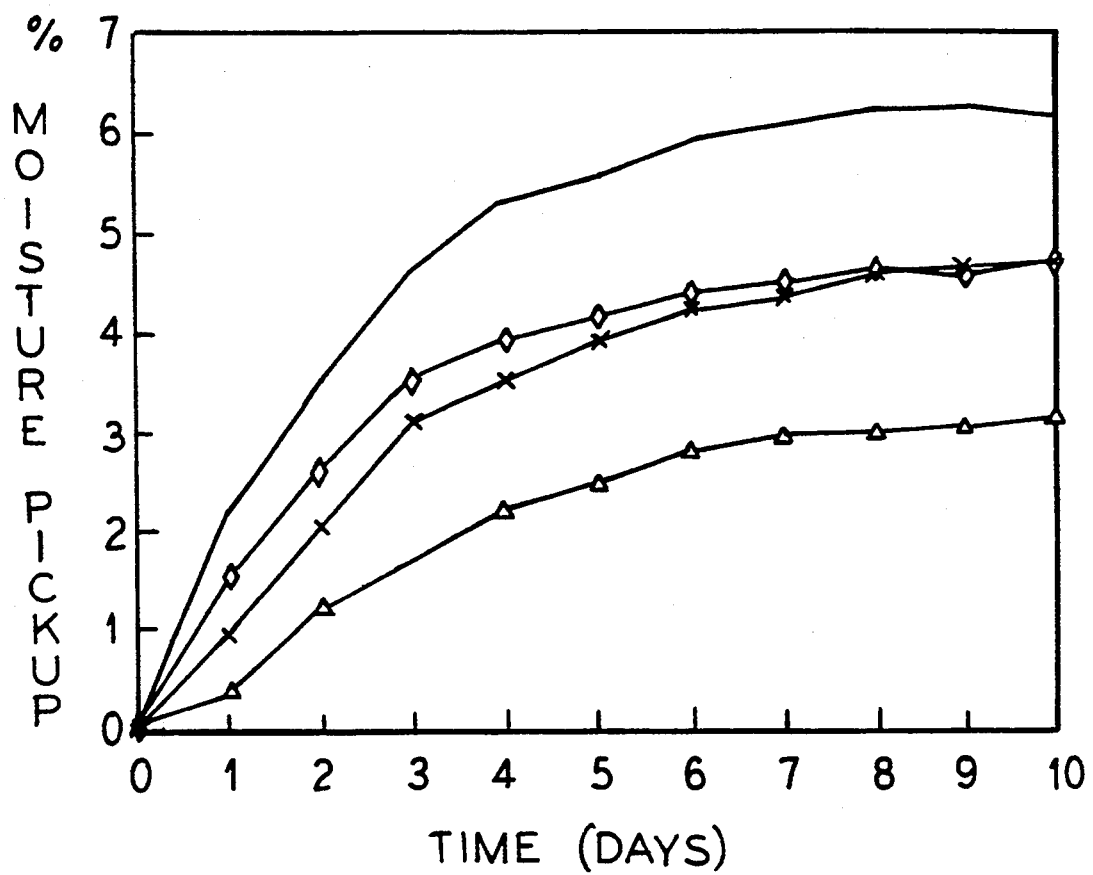
FIG. 2 illustrates the weight gain as a function of time for chewing gum sticks coated with different thicknesses (wet) of aqueous HPMC, and no wax.

Referring to FIG. 2, chewing gum sticks prepared by removing the rolling compound, and coated with various thicknesses of 13.3% Methocel E5 solution (measured before drying), but not coated with any wax, were compared to the unprepared, uncoated chewing gum control sticks. Coatings of 0.50 and 0.90 mil of Methocel E5 solution (measured before drying) resulted in about a 25% reduction in moisture pickup over the 10-day period, compared with the control. A coating of 1.50 mils of Methocel E5 solution caused further improvement, resulting in a reduction in moisture pickup of more than 50%, compared with the control.

EXAMPLE 3

Figure 3:
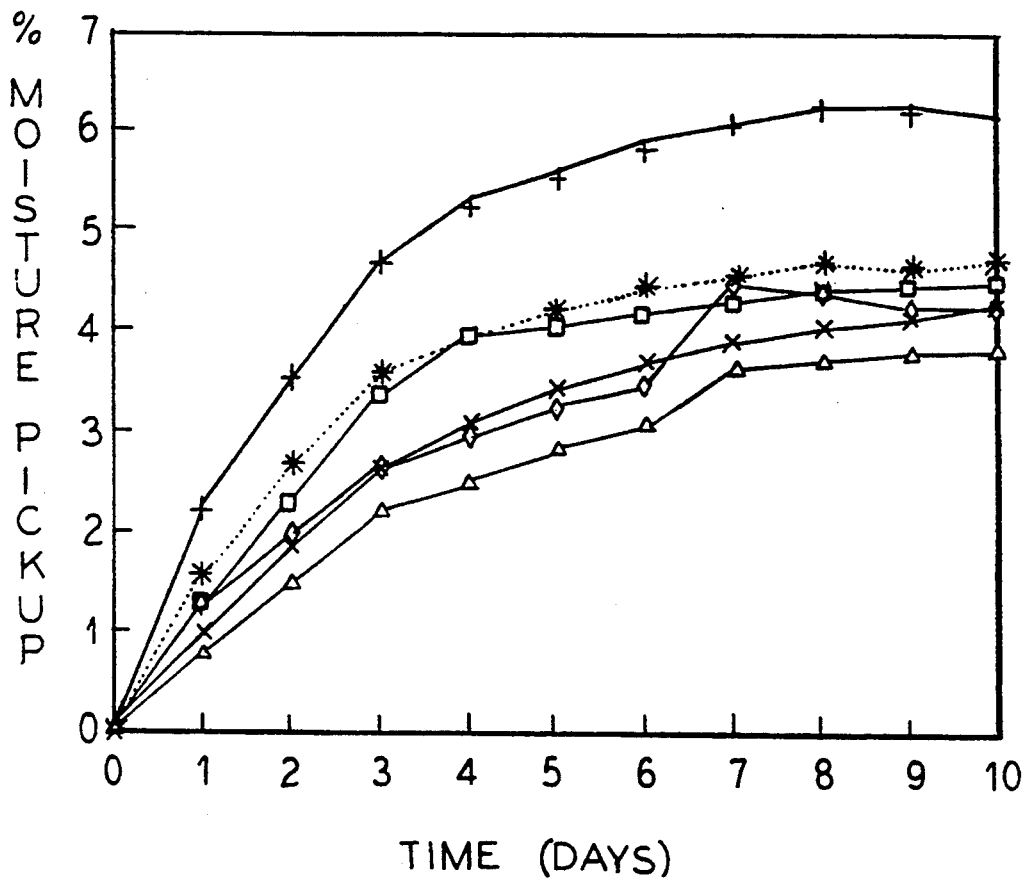
FIG. 3 illustrates the weight gain as a function of time for chewing gum sticks coated on both sides with 0.9 mils (wet) of aqueous HPMC and beeswax, for different thicknesses of beeswax and for no wax.

Referring to FIG. 3, the sample called "Control 1" refers to the chewing gum sticks, which were uncoated and unprepared (i.e., with the rolling compound intact). The sample called "Control 2" refers to the uncoated chewing gum sticks, which were "prepared" by removing the rolling compound. The sample called "Control 3" refers to prepared chewing gum sticks, coated on both sides with 0.9 mil of 13.3% Methocel E5 solution (measured before drying) but not coated with any wax. The remaining sample consisted of prepared chewing gum sticks coated with 0.9 mil of Methocel E5 solution (measured before drying) and further coated with 0.9, 1.65, 2.0 and 3.0 mils, respectively, of beeswax.

Control 1 and Control 2 both picked up more than 6% by weight additional moisture in 10 days, indicating that removal of the rolling compound had no significant effect on moisture pickup. Control 3 picked up about 4.7% by weight additional moisture, indicating significant improvement resulting from the coating with HPMC alone. The remaining samples showed further reduction of moisture pickup resulting from coating with beeswax in addition to HPMC, with the reduction being more pronounced as the thickness of beeswax was increased.

EXAMPLE 4

Figure 4:
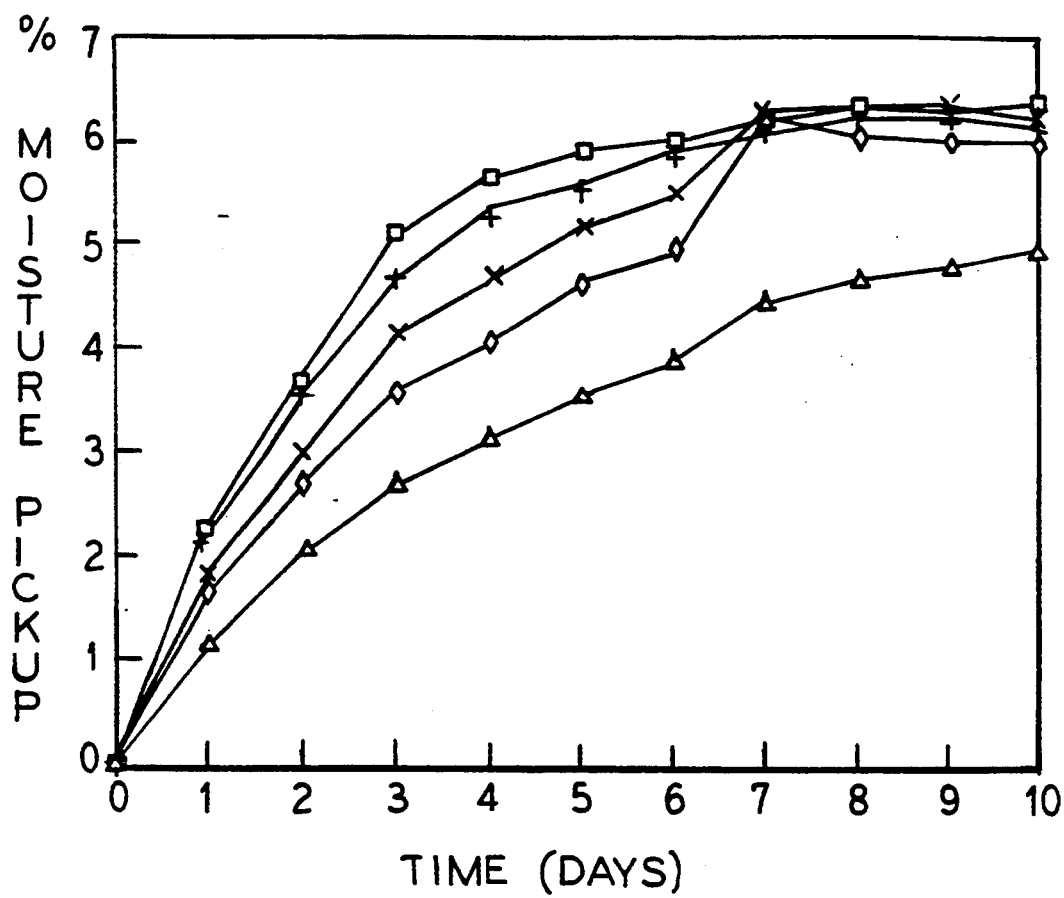
FIG. 4 illustrates the weight gain as a function of time for chewing gum sticks coated with different thicknesses of beeswax only, and no HPMC

Referring to FIG. 4, the samples called "Control 1" and "Control 2" are the same as described above in Example 3. The remaining samples were prepared chewing gum sticks coated with 0.9, 1.65, 2.0 and 3.0 mils, respectively, of beeswax, but not coated with HPMC. While the beeswax alone caused some reduction in moisture pickup, particularly at 3.0 mils, the reduction was much less than when the chewing gum sticks were coated with HPMC and beeswax. This can be seen by comparing FIG. 4 and FIG. 3.

EXAMPLE 5

Figure 5:
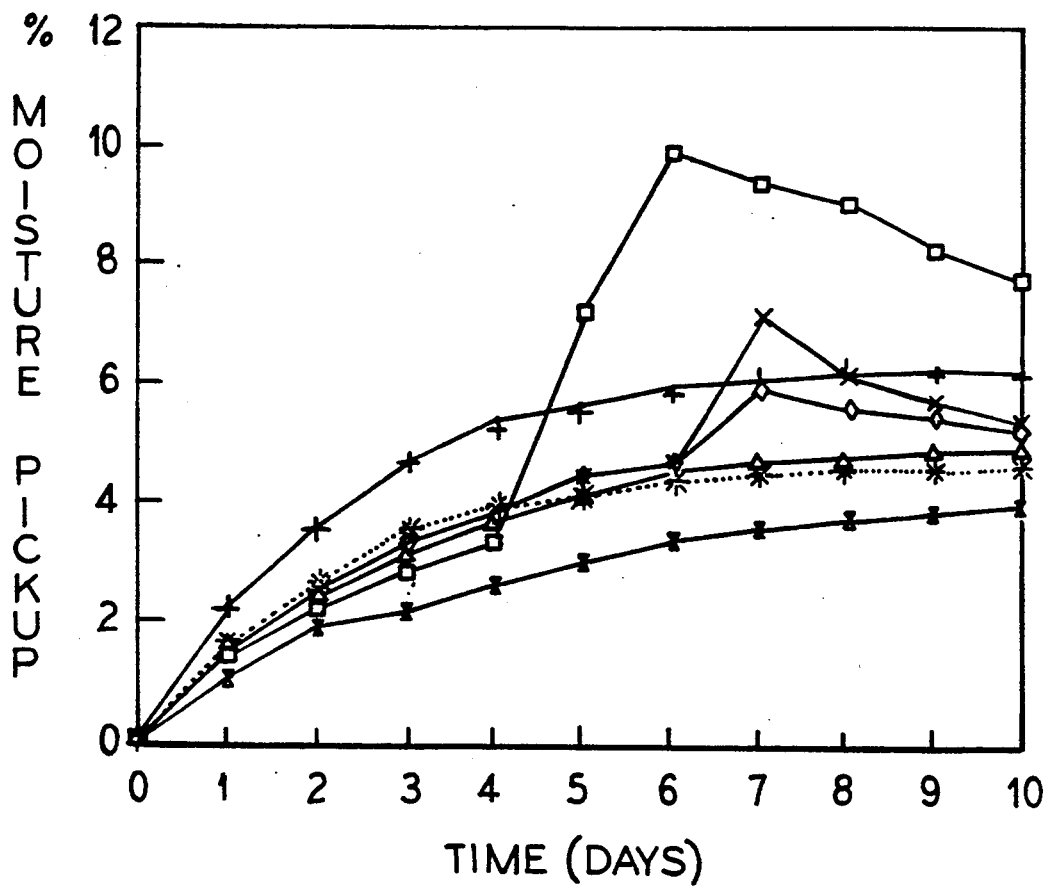
FIG. 5 illustrates the weight gain as a function of time for chewing gum sticks coated on both sides with 0.9 mils (wet) of aqueous HPMC and Victory (microcrystalline) wax, for different thicknesses of Victory wax and for no wax.

Referring to FIG. 5, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.45, 1.1, 1.65, 2.0 and 3.0 mils, respectively, of Victory wax. Victory wax is a synthetic microcrystalline wax available from the Petrolite Company in Tulsa, Okla., and is softer than beeswax.

Comparison of the wax-coated samples with Controls 1 and 2 indicates that the samples with wax coatings of 1.1 mils and above (in addition to HPMC) showed reduced moisture pickup after 10 days, compared with the uncoated chewing gum sticks. The sample with a wax coating of 0.45 mils did not show a consistent or overall improvement in moisture pickup. Comparison of the wax-coated samples with Control 3 indicates that only the thickest of the wax coatings, 3.0 mils, showed further reduction in moisture pickup compared with the chewing gum sticks coated with HPMC and no wax.

EXAMPLE 6

Figure 6:
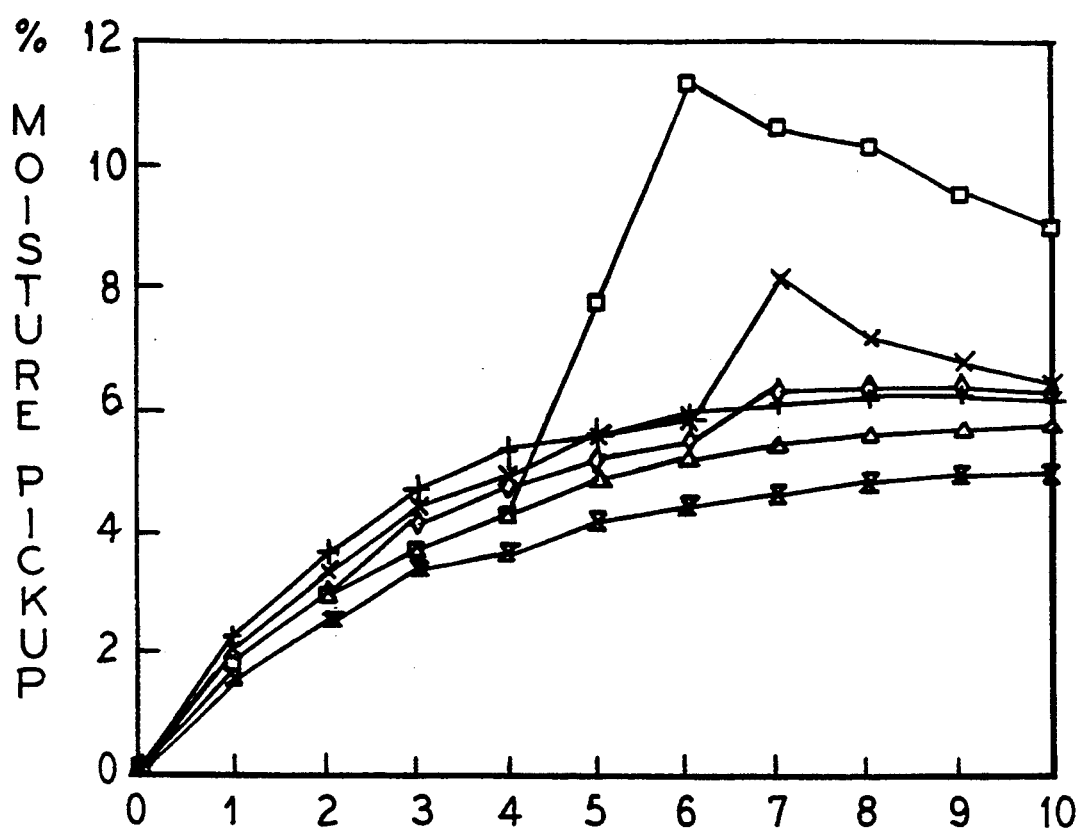
FIG. 6 illustrates the weight gain as a function of time for chewing gum sticks coated with different thicknesses of Victory wax only, and no HPMC.

Referring to FIG. 6, the samples called "Control 1" and "Control 2" are the same as described above in Example 3. The remaining samples were prepared chewing gum sticks coated with 0.45, 1.1, 1.65, 2.0 and 3.0 mils, respectively, of Victory wax, but not coated with HPMC. Only the thickest of wax coatings, 2.0 and 3.0 mils, showed consistent reductions in moisture pickup compared to the uncoated chewing gum controls.

EXAMPLE 7

Figure 7:
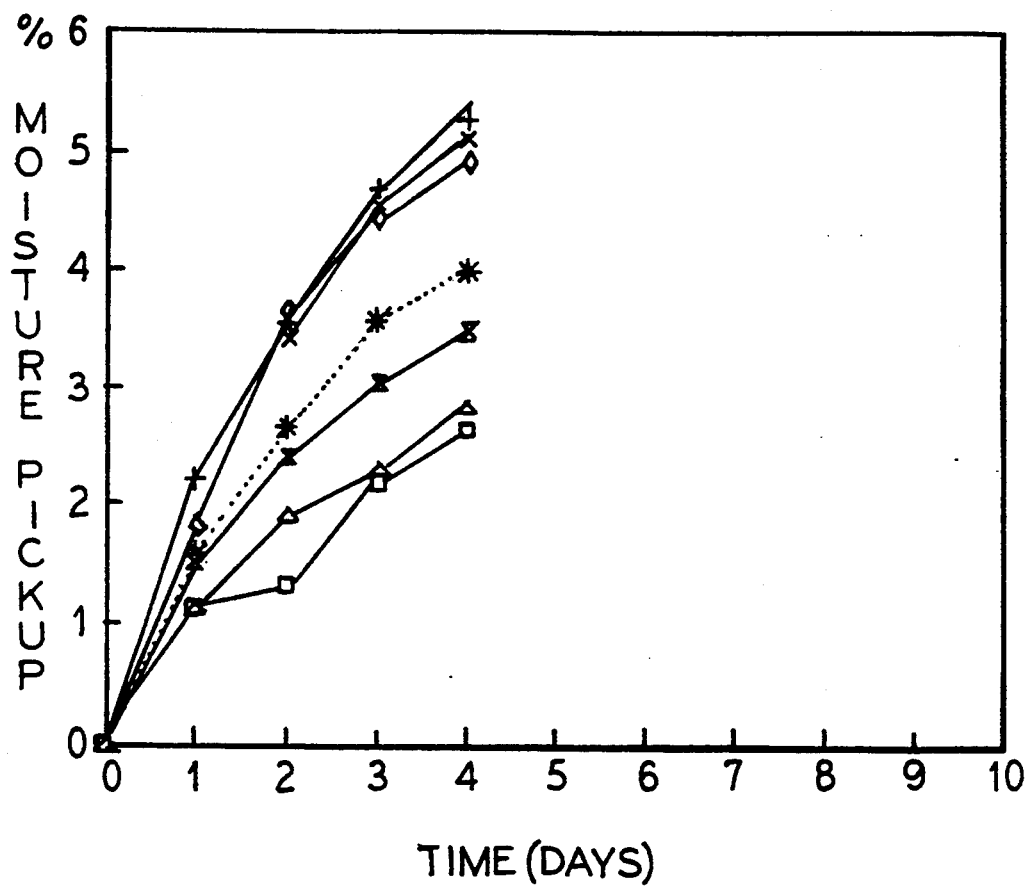
FIG. 7 illustrates the weight gain as a function of time for chewing gum sticks coated on both sides with 0.9 mils (wet) of aqueous HPMC and Besquare 185 (microcrystalline) wax, for different thicknesses of Besquare 185 wax and for no wax.

Referring to FIG. 7, the samples called "Control 1," "Control 2" and "Control 3" are the same as described above in Example 3. The remaining samples were prepared chewing gum sticks coated with 0.9 mil of 13.3% Methocel E5 solution (measured before drying) and further coated with 0.65, 1.1, 1.65, 2.1 and 3.1 mils, respectively, of Besquare 185 wax. Besquare 185 is a synthetic microcrystalline wax available from the Petrolite Co. in Tulsa, Okla. Besquare 185 is harder and more crystalline than Victory wax and has a less branched, more linear molecular structure.

Comparison of the wax-coated samples with Controls 1 and 2 indicates that, in general, the samples with wax coatings in addition to HPMC showed, reduced moisture pickup after four days, compared with the uncoated chewing gum sticks.

EXAMPLE 8

Figure 8:
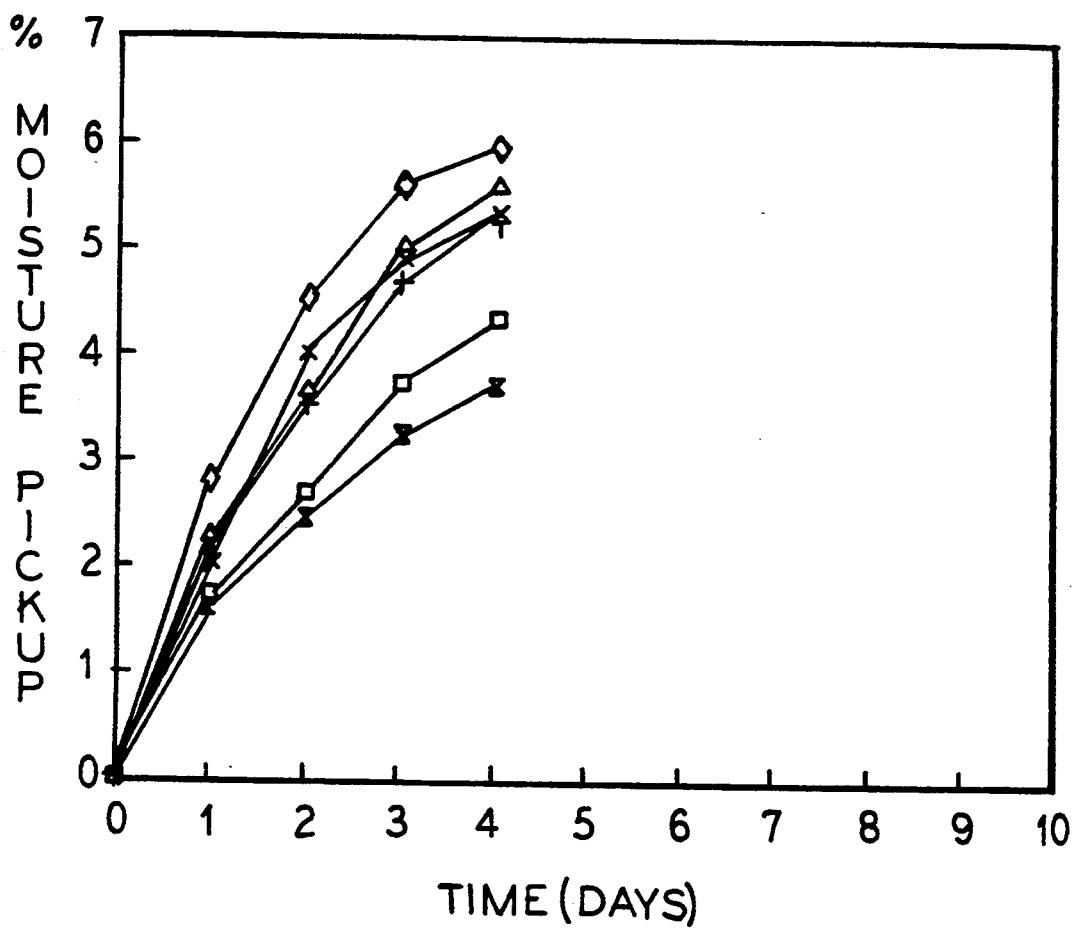
FIG. 8 illustrates the weight gain as a function of time for chewing gum sticks coated with different thicknesses of Besquare 185 wax only, and no HPMC.

Referring to FIG. 8, the samples called "Control 1" and "Control 2" are the same as described above in Example 3. The remaining samples were prepared chewing gum sticks coated with 0.65, 1.1, 1.65, 2.1 and 3.1 mils, respectively, of Besquare 185 wax, but not coated with HPMC.

Some of the wax-coated samples showed reduced moisture pickup compared with the uncoated chewing gum sticks, while others did not. There was no recognizable correlation between the thickness of the wax coating and the amount of moisture pickup, possibly due to cracking of the relatively hard wax.

EXAMPLE 9

Figure 9:
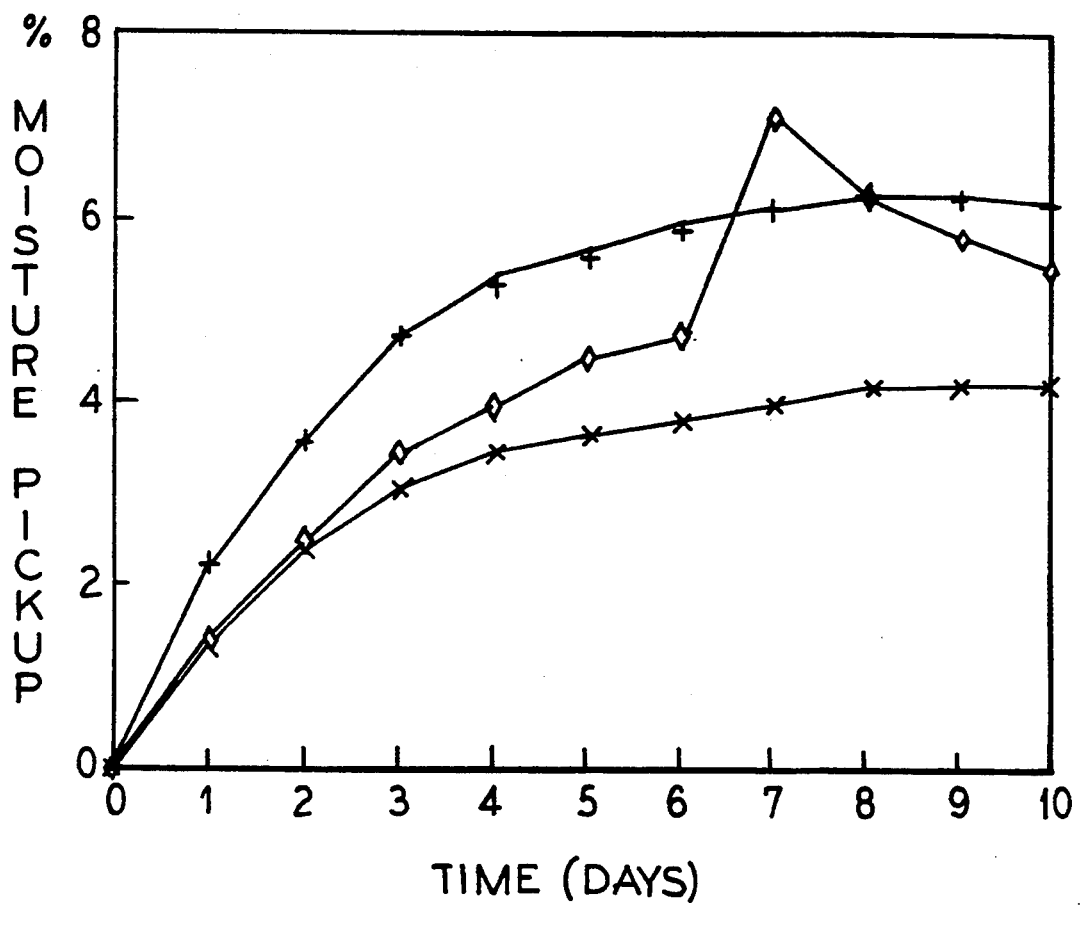
FIG. 9 illustrates the weight gain as a function of time for chewing gum sticks coated with HPMC and Victory wax after the rolling compound has been removed (prepared sample) compared with chewing gum sticks coated with HPMC and Victory wax without removing the rolling compound (unprepared sample).

Referring to FIG. 9, the samples called "Control 1" and "Control 2" are the same as described above in Example 3. One of the remaining samples consisted of prepared chewing gum sticks coated with 0.9 mils of 13.3% Methocel E5 solution (measured before drying) and 1.1 mils of Victory wax. The other of the remaining samples consisted of unprepared chewing gum sticks coated with 1.1 mils of Methocel E5 solution and 1.1 mils of Victory wax.

From the data, it cannot be said that the prepared chewing gum sticks coated with HPMC and wax, absorbed less additional moisture than the unprepared chewing gum sticks, coated with HPMC and wax. Both coated samples showed reduced moisture pickup compared to the uncoated chewing gums sticks.

EXAMPLE 10

Figure 10:
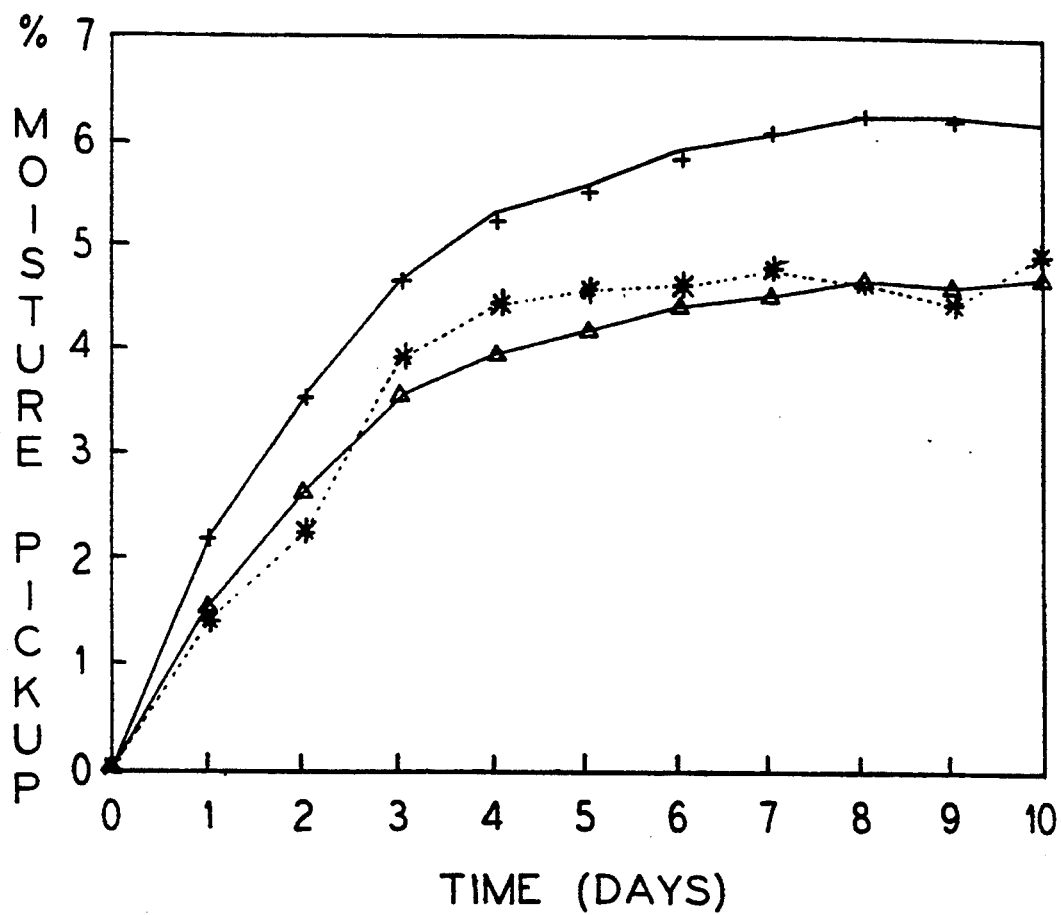
FIG. 10 illustrates the weight gain as a function of time for chewing gum sticks coated with HPMC only, after the rolling compound has been removed (prepared sample) and without removing the rolling compound (unprepared sample).

Referring to FIG. 10, the samples called "Control 1" and "Control 2" are the same as described above in Example 3. One of the remaining samples consisted of prepared chewing gum sticks coated with 0.9 mils of 13.3% Methocel E5 solution (measured before drying) but not coated with wax. The other of the remaining samples consisted of unprepared chewing gum sticks coated with 1.1 mils of Methocel E5 solution, but not coated with wax.

Again, whether or not the dusting compound was removed prior to coating, made no difference in the performance of the samples coated with HPMC. Both coated samples showed reduced moisture pickup compared to the uncoated chewing gum sticks.

EXAMPLE 11

Figure 11:
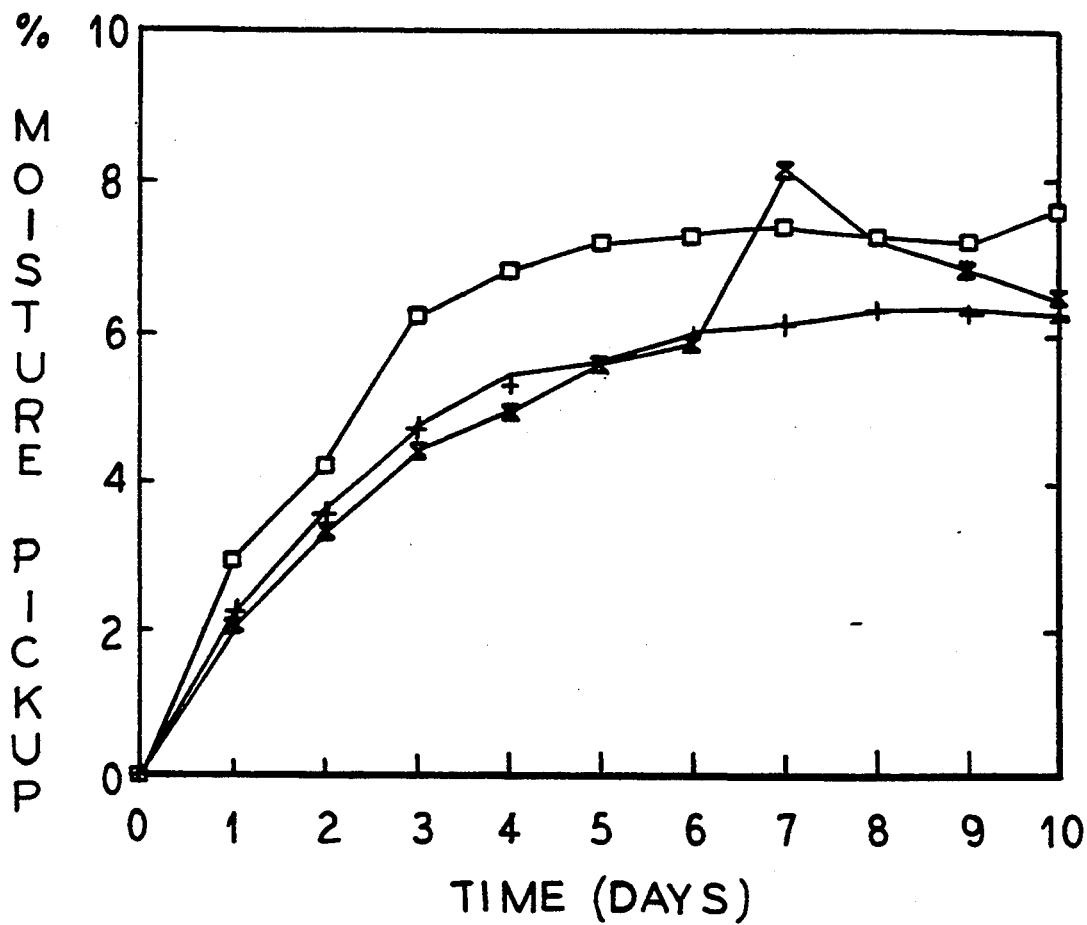
FIG. 11 illustrates the weight gain as a function of time for chewing gum sticks coated with Victory wax only, after the rolling compound has been removed (prepared sample) and without removing the rolling compound (unprepared sample).

Referring to FIG. 11, the samples called "Control 1" and "Control 2" are the same as described above in Example 3. The remaining samples consist of prepared and unprepared chewing gum sticks coated with 1.1 mils of Victory wax but no HPMC.

Neither of the samples coated with Victory wax, but not HPMC, showed a reduction in moisture pickup compared to the uncoated chewing gum sticks.

By way of example, the following contemplative examples are given:

EXAMPLE 12

A 30% solution of gum arabic (acacia) in water may be prepared and sprayed onto the surface of stick gum. After drying at about 120° F. for several minutes, or until the surface becomes slightly tacky, molten beeswax may then be sprayed over this surface. This will provide an edible film coating to protect stick gum from moisture absorption.

EXAMPLE 13

A sample may be prepared in a similar manner as in Example 12, but a 30% solution of a maltodextrin is used in place of gum arabic.

EXAMPLE 14

A sample may be prepared in a similar manner as in Example 12, but a 5% solution of sodium alginate is used in place of gum arabic. Also, molten carnauba wax may be used in place of molten beeswax.

EXAMPLE 15

A sample may be prepared in a similar manner as Example 12, but a 20% gelatin solution may replace a 30% solution of gum arabic. Also, molten paraffin wax may be used in place of molten beeswax.

EXAMPLE 16

A sample may be prepared in a similar manner as Example 12, but a 10% ethyl cellulose is used in place of gum arabic solution. Also, molten stearic acid may be used to replace molten beeswax.

EXAMPLE 17

Emulsions of ethyl cellulose are available from at least two manufacturers that can be used pursuant to the present invention. One emulsion is sold under the designation Aquacoat ® and is available from FMC Corporation of Philadelphia, Pa. It is comprised of 85% solids in water. The principal solid is ethyl cellulose and the remaining solids are sodium lauryl sulfate, and cetyl alcohol.

The other material that is at least believed to function satisfactorily in the present invention is sold under the designation Surelease and is available from Colorcon, Inc. of West Point, Pa. It is comprised of ethyl cellulose, plasticizers dibutyl sebacate and oleic acid, ammoniated water and fumed silica.

Both materials are highly stable emulsions at 25-30% solids and are used as coatings in the pharmaceutical industries.

A wide variety of wax, shellac, and modified starch emulsions/dispersions are available such as Capol coating agents from Kaul GmbH, Elmshorn, West Germany and distributed in North America by Centerchem, Inc., Stanford, Conn.

These materials may be applied to sick gum as an edible film forming agent. If needed, molten waxes such as rice bran wax, candelilla wax, or other waxes, or molten hydrogenated oils, like vegetable oil, cottonseed oil, soybean oil, palm oil, and other hardened oils can be used to cover the edible film forming agent.

EXAMPLE 18

A sample may be prepared in a similar manner as Example 12, but a 25% zein/alcohol solution may be applied to stick gum.

After drying, a 10% rice bran wax dispersed in alcohol may be applied over the initial film coating. This wax emulsion may be prepared by homogenizing rice bran wax with water/alcohol and an emulsifier such as triacetin.

EXAMPLE 19

A stick chewing gum may be coated with an edible film such as 10% PVAC (polyvinylacetate) in alcohol. After the alcohol is removed, an outer coating of molten beeswax may be applied to obtain a PVAC/wax moisture protective edible film.

EXAMPLE 20

A stick chewing gum may be coated with an HPMC/HPC (hydroxypropyl methylcellulose/hydroxypropyl cellulose) preformed film made with PEG (polyethylene glycol) that has been dispersed in water by homogenizing. After the film has dried, molten magnesium stearate is added to cover the initial film.

EXAMPLE 21

A 30% solution of oligofructose in water is prepared and applied to a stick gum by spraying. After drying, a mixture of carnauba wax and octoglycerol mono oleate (a polyglycerol ester) is applied in molten form. After the second coating is cooled, a mixture of sugar and talc is applied to obtain a dry surface.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A method of preparing coated chewing gum sticks with improved shelf life, comprising the steps of:
   preparing a chewing gum composition including a water soluble bulk portion, a water insoluble chewing gum base portion, and one or more flavoring agents;
   forming the chewing gum composition into a sheet having first and second sides;
   applying a coating of an edible film forming agent to the first and second sides of the sheet;
   applying a coating of a second material chosen from the group consisting of wax, fats, fatty acids, oils, and lipid derivatives over the coating of edible film forming agent; and
   cutting the sheet into chewing gum sticks.

2. The method of claim 1 wherein the coating of edible film forming agent is applied to the first side of the sheet and the second material is applied to the first side before the edible film forming agent is applied to the second side.

3. The method of claim 1 including the step of cutting the sheet into chewing gum sticks after the second material is applied.

4. The method of claim 1 wherein the coating of edible material includes an edible film forming agent chosen from the group consisting of: cellulose derivatives; modified starch; dextrin; gelatin; zein; vegetable gums; proteins; edible polymers; edible plastic film; maltodextrins; low calorie carbohydrate bulking agents; shellac; and combinations thereof.

5. The method of claim 1 wherein the edible material is applied by spraying the edible material on the sheet.

6. The method of claim 1 wherein the edible material is applied by using a roller to coat the edible material onto the sheet.

7. The method of claim 1 wherein the edible material is applied by coextruding the edible material onto the sheet.

8. A method for preparing coated chewing gum sticks having improved shelf life comprising the steps of:
   preparing a stick of chewing gum that includes a coating of an edible material that provides sufficient vapor barrier properties to provide the stick of chewing gum with a more stable moisture content, under ambient conditions, than a stick of chewing gum that does not include the coating.

9. The method of claim 8 wherein the coating of edible material includes an edible film forming agent chosen from the group consisting of: cellulose derivatives; modified starch; dextrin; gelatin; zein; vegetable gums; proteins; edible polymers; edible plastic film; maltodextrins; polyols; low calorie carbohydrate bulking agents; shellac; and combinations thereof.

10. The method of claim 8 wherein the coating of edible material includes a component chosen from the group consisting of: wax, fatty acids, fats, oils, and lipid derivatives.

11. The method of claim 8 wherein the coating of edible material comprises:
    a first layer of an edible film forming agent; and
    a second layer of a material chosen from the group consisting of: wax, lipids, fatty acids, fats, and oils.

12. The method of claim 8 wherein the coating of edible material is an emulsion including at least two materials chosen from the group consisting of: carbohydrates; modified carbohydrates; carbohydrate derivatives; proteins; and lipids.

13. The method of claim 12 wherein the coating of edible material includes an emulsion chosen from the group consisting of: pseudolatexes; colloidal dispersions; ethylcellulose emulsions; and wax emulsions.

14. The method of claim 8 wherein the stick of chewing gum includes a first side and a second side and the coating of edible material is applied to each of the first and second sides.

15. The method of claim 8 wherein the edible material is applied by spraying the edible material onto the sheet.

16. The method of claim 8 wherein the edible material is applied by using a roller to coat the edible material onto the sheet.

17. The method of claim 8 wherein the edible material is applied by coextruding the edible material onto the sheet.

18. A chewing gum stick comprising:
    a chewing gum composition including a water soluble bulk portion, a water insoluble chewing gum base portion, and one or more flavoring agents formed into a chewing gum stick; and
    the chewing gum stick including a coating, that coats an entire outer surface of the chewing gum stick, including an edible material and a second material chosen from the group consisting of wax, fatty acids, fats, oils, and lipid derivatives.

19. The chewing gum of claim 18 wherein the edible material includes an edible film forming agent chosen from the group consisting of: cellulose derivatives; modified starch; dextrin; gelatin; zein; vegetable gums; proteins; edible polymers; edible plastic film; maltodextrins; polyols; low calorie carbohydrate bulking agents; shellac; and combinations thereof.

20. The chewing gum of claim 18 wherein the coating of edible material includes an emulsion chosen from the group consisting of: pseudolatexes; colloidal dispersions; ethylcellulose emulsions; and wax emulsions.

21. The chewing gum of claim 18 wherein the coating is a multilayer coating.

22. The chewing gum of claim 21 wherein the multilayer coating includes a first layer of the edible film and a second layer of the second material.

23. A coated chewing gum stick having improved shelf life comprising:
    a stick of chewing gum that includes a coating of an edible material that coats an entire outer surface of the stick of chewing gum and provides sufficient vapor barrier properties to provide the stick of chewing gum with a more stable moisture content, under ambient conditions, than a stick of chewing gum that does not include the coating.

24. The chewing gum of claim 23 wherein the coating of edible material includes an edible film forming agent chosen from the group consisting of: cellulose derivatives; modified starch; dextrin; gelatin; zein; vegetable gums; proteins; edible polymers; edible plastic film; maltodextrins; polyols; low calorie carbohydrate bulking agents; shellac; and combinations thereof.

25. The chewing gum of claim 23 wherein the coating of edible material includes a component chosen from the group consisting of: wax, fatty acids, fats, oils, and lipid derivatives.

26. The chewing gum of claim 23 wherein the coating of edible material comprises:
   a first layer of an edible film forming agent; and
   a second layer of a material chosen from the group consisting of: wax, lipids, fatty acids, fats, and oils.

27. The chewing gum of claim 23 wherein the coating of edible material includes an emulsion chosen from the group consisting of: vegetable wax emulsions; ethylcellulose emulsions; and petrolite wax emulsions.

* * * * *